US012561746B2

(12) United States Patent
Schmelkin et al.

(10) Patent No.: US 12,561,746 B2
(45) Date of Patent: Feb. 24, 2026

(54) EXTRACTING RULES AND DETERMINING RISK PARAMETERS FROM AN UNDERWRITING MANUAL

(71) Applicant: Sixfold AI, Inc., New York, NY (US)

(72) Inventors: Alexander M. Schmelkin, New York, NY (US); Brian Moseley, New York, NY (US); Jane Tran, New York, NY (US); Ian Namit Hirschfeld, New York, NY (US); Gregory Hess Tourville, New York, NY (US); Laurence Brouillette, New York, NY (US); Samuel Levine, New York, NY (US)

(73) Assignee: Sixfold AI, Inc., New York, NY (US)

( * ) Notice: Subject to any disclaimer, the term of this patent is extended or adjusted under 35 U.S.C. 154(b) by 0 days.

(21) Appl. No.: 18/622,163

(22) Filed: Mar. 29, 2024

(65) Prior Publication Data

US 2025/0307942 A1 Oct. 2, 2025

(51) Int. Cl.
G06Q 40/08 (2012.01)
(52) U.S. Cl.
CPC ................................... G06Q 40/08 (2013.01)
(58) Field of Classification Search
CPC ................................................... G06Q 40/08
See application file for complete search history.

(56) References Cited

U.S. PATENT DOCUMENTS

| | | | |
|---|---|---|---|
| 11,062,327 B2 | 7/2021 | Biswas et al. | |
| 11,194,784 B2 | 12/2021 | Brisimi et al. | |
| 11,411,979 B2 * | 8/2022 | Bulut .................... | H04L 63/102 |
| 11,709,854 B2 | 7/2023 | Saraswat et al. | |
| 2009/0299896 A1 * | 12/2009 | Zhang .................... | G06Q 40/00 |
| | | | 705/38 |
| 2020/0020040 A1 | 1/2020 | Gokhale et al. | |

* cited by examiner

*Primary Examiner* — Edward Chang
(74) *Attorney, Agent, or Firm* — Schwegman Lundberg & Woessner, P.A.

(57) ABSTRACT

Aspects of the present disclosure involve a system comprising a computer-readable storage medium storing a program and method for extracting rules and determining risk parameters from an underwriting manual. The program and method provide for receiving an underwriting manual for an insurance carrier, wherein the underwriting manual comprises text describing rules, guidelines and parameters defining a risk appetite of the insurance carrier; processing the underwriting manual using one or more neural network models, the one or more neural network models having been trained with domain-specific data to analyze text across plural underwriting manuals; determining, based on the processing, insurance rules and risk parameters for the text in the underwriting manual; and generating a set of rules based on the insurance rules and risk parameters.

19 Claims, 14 Drawing Sheets

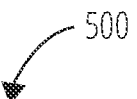

500

RECEIVE AN UNDERWRITING MANUAL FOR AN INSURANCE CARRIER, WHEREIN THE UNDERWRITING MANUAL COMPRISES TEXT DESCRIBING RULES, GUIDELINES AND PARAMETERS DEFINING A RISK APPETITE OF THE INSURANCE CARRIER 502

PROCESS THE UNDERWRITING MANUAL USING ONE OR MORE NEURAL NETWORK MODELS, THE ONE OR MORE NEURAL NETWORK MODELS HAVING BEEN TRAINED WITH DOMAIN-SPECIFIC DATA TO ANALYZE TEXT ACROSS PLURAL UNDERWRITING MANUALS 504

DETERMINE, BASED ON THE PROCESSING, INSURANCE RULES AND RISK PARAMETERS FOR THE TEXT IN THE UNDERWRITING MANUAL 506

GENERATE A SET OF RULES BASED ON THE INSURANCE RULES AND RISK PARAMETERS 508

⊞ Life

Guidelines

Choose which Signals are Most Important for your Underwriters to Consider when Reviewing a Case for Life Insurance

602

Medical Signals

Which Diagnoses, Medications, or Procedures Should we Flag to Underwriters?

| | | |
|---|---|---|
| Abdominal Aortic Aneurysm Surgically Corrected in the Last 6 Months | ⊘ | ✎ |
| Abnormal Cardiac Test (or Other Abnormal Testing) | ⇩ | ✎ |
| Alcohol Treatment in the Last 2 Years | ⊘ | ✎ |
| Alzheimer's Disease or Dementia | ⊘ | ✎ |
| Automatic Defibrillator (ACID) Implanted with History of Cardiac Arrest | ⊘ | ✎ |
| Barrett's Esophagus | ⇩ | ✎ |
| Blood Pressure Exceeding 185/100 | ⊘ | ✎ |
| BMI of 23-25 | ⇧ | ✎ |
| Cancer or Malignant Tumor (Not Basal Cell or Squamous Cell) | ⇩ | ✎ |
| Cardiomyopathy (Congestive Heart Failure) | ⇩ | ✎ |
| Carotid Artery Disease/Stenosis | ⇩ | ✎ |
| Cerebral Aneurysm | ⇩ | ✎ |
| Cerebrovascular Disease | ⇩ | ✎ |
| Cirrhosis of Liver | ⊘ | ✎ |
| Coagulation Disorder | ⇩ | ✎ |
| Collagen Disease | ⇩ | ✎ |
| Congenital Heart Disease | ⇩ | ✎ |
| Connective Tissue Disorder | ⇩ | ✎ |
| Coronary Artery Disease | ⇩ | ✎ |
| Current Cancer Treatment | ⊘ | ✎ |
| CVA (Stroke) Within 1Year | ⊘ | ✎ |
| Diabetes if Significantly Complicated or Very Poor Control | ⊘ | ✎ |
| Diabetes Type 1 | ⇩ | ✎ |
| Drug Use (Other than Marijuana) in the Last 3 Years | ⊘ | ✎ |
| Eating Disorder | ⇩ | ✎ |

FIG. 6A

| | | |
|---|---|---|
| Favorable Lab Risk Score on Cases Standard or Better | ⇧ | ✎ |
| Gastric/Intestinal Bypass within 6 Months | ⊘ | ✎ |
| GI Hemorrhage | ⇩ | ✎ |
| Good Exercise Capacity Testing (Age 40-70) | ⇧ | ✎ |
| Grand Mal Seizures within 1 Year of Diagnosis | ⊘ | ✎ |
| Hemochromatosis | ⇩ | ✎ |
| Hemoglobin A1C < 5.5 | ⇧ | ✎ |
| HIV Positive | ⊘ | ✎ |
| Idiopathic Thrombocytopenic Purpura (ITP) | ⇩ | ✎ |
| Juvenile Onset Diabetes Younger than Age 20 | ⊘ | ✎ |
| Kidney Dialysis | ⊘ | ✎ |
| LDL <100 within 6 Months and Cholesterol/HDL Ratio ≤5.0 Without Medication | ⇧ | ✎ |
| Liver Disorder (Other than Fatty Liver) | ⇩ | ✎ |
| Lupus (SLE) | ⇩ | ✎ |
| Lymph Node Disorder | ⇩ | ✎ |
| Major Depression | ⇩ | ✎ |
| Major Surgery Advised But Not Yet Completed | ⊘ | ✎ |
| Medical Testing Advised but not Yet Completed | ⊘ | ✎ |
| Medicinal Marijuana (Assessment Will be Based on Disorder Requiring this Therapy) | ⇩ | |
| Mental Disorder Requiring Hospitalization/Disability in Last Year | ⊘ | ✎ |
| MI/Heart Attack in the Last 6 Months | ⊘ | ✎ |
| More than one Suicide Attempt in Last 2 Years | ⊘ | ✎ |
| Multiple Sclerosis | ⇩ | ✎ |
| Muscular Dystrophy | ⇩ | ✎ |
| Myelodysplastic Syndrome | ⊘ | ✎ |
| Narcolepsy | ⇩ | ✎ |
| Normal Cardiac Cath or Cardiac CT Angiogram (Age 40-70) within 3 Years | ⇧ | ✎ |
| Normal Carotid Ultrasound | ⇧ | ✎ |
| Normal CBC within 12 Months (Age 60-70) | ⇧ | ✎ |

| | | |
|---|---|---|
| Normal Chest or Abdominal CT Scan Within 2 Years | ⇧ | 🖉 |
| Normal Colonoscopy Within 3 Years | ⇧ | 🖉 |
| Normal LFTs and Triglycerides <200 Mg/DL | ⇧ | 🖉 |
| Normal Mammogram Within 2 Years | ⇧ | 🖉 |
| Normal Prostate Exam Within 2 Years | ⇧ | 🖉 |
| Normal Stress EKG, Thallium Stress Echo, Sestamibi EBCT, or Other Perfusion or Imaging Test Within | | |
| NT Pro-BNP ≤100 (Age 60-70) | ⇧ | 🖉 |
| Organ Transplant (Awaiting or Recipient) | 🚫 | 🖉 |
| Osteomyelitis | ⇩ | 🖉 |
| Pancreatic Disorder | ⇩ | 🖉 |
| Parkinson's Disease | ⇩ | 🖉 |
| Polycystic Kidney Disease | ⇩ | 🖉 |
| Polycythemia | ⇩ | 🖉 |
| Pregnant with Gestational Diabetes/Toxemia/Eclampsia/Pre-Eclampsia | 🚫 | 🖉 |
| PSA Abnormality | ⇩ | 🖉 |
| Quadriplegia | 🚫 | 🖉 |
| Renal Failure (Chronic Kidney Disease) | ⇩ | 🖉 |
| Rheumatoid Disorders Including Rheumatoid Arthritis and Lupus | ⇩ | 🖉 |
| Severe COPD/Emphysema (on Oxygen or Disabling) | 🚫 | 🖉 |
| Significant Psychiatric Illness (Includes Bipolar Disorder, Psychotic Disorder, and Schizophrenia) | ⇩ | 🖉 |
| Significant Respiratory Disorder (Includes COPD, Pulmonary Embolism, and Pulmonary Nodules) | ⇩ | 🖉 |
| Stroke or TIA | ⇩ | 🖉 |
| Suicide Attempt | ⇩ | 🖉 |
| Suicide Attempt in the Last Year | 🚫 | 🖉 |
| Term Insurance Age > 70 & Rated Over Table D or with A Flat Extra | 🚫 | 🖉 |
| Ulcerative Colitis (and Similar Disorders) | ⇩ | 🖉 |
| Untreated Blood Pressure 120/80 or Better (Age 40-70) Maintained for Past 6 Months | ⇧ | 🖉 |
| Valve Replacement Within 6 Months | 🚫 | 🖉 |
| Valvular Heart Disease (Includes Mitral Regurgitation, Mitral Stenosis, Aortic Regurgitation, Aortic Sten | | |
| 610⌐ | ⊕ Keyword Signal | |

FIG. 6A(Continued)

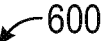
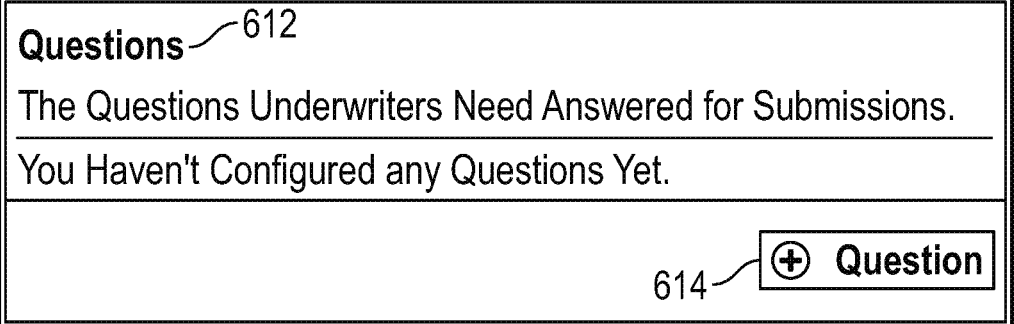
Questions —612
The Questions Underwriters Need Answered for Submissions.
You Haven't Configured any Questions Yet.
614 — ⊕ Question
FIG. 6B

700

Guidelines
Specify Which Keywords and Classifications Should Affect Your Risk Appetite for your Line of Business.

702 — SIC Code Signals
Matching Any of these Codes Adjusts the Risk Score Appropriately.

| | | |
|---|---|---|
| 2022 · Cheese; Natural and Processed | ⇧ | ✎ |
| 214 · Sheep and Goats | ⇩ | ✎ |
| 241 · Dairy Farms | ⇩ | ✎ |
| 2869 · Industrial Organic Chemicals, Nec | ⇧ | ✎ |
| 3312 · Blast Furnaces and Steel Mills | ⇩ | ✎ |
| 3316 · Cold Finishing of Steel Shapes | ⇩ | ✎ |
| 3317 · Steel Pipe and Tubes | ⇩ | ✎ — 706 |
| 3545 · Machine Tool Accessories | ⇧ | ✎ — 708 |
| 3556 · Food Products Machinery | ⇧ | ✎ |
| 3559 · Special Industry Machinery, Nec | ⇧ | ✎ |
| 4119 · Local Passenger Transportation, Nec | ⇧ | ✎ |
| 4482 · Ferries | ⇧ | ✎ |
| 5137 · Women's and Children's Clothing | ⇩ | ✎ |
| 5912 · Drug Stores and Proprietary Stores | ⇧ | ✎ |
| 7373 · Computer Integrated Systems Design | ⇧ | ✎ |
| 8734 · Testing Laboratories | ⊘ | ✎ |
| 8742 · Management Consulting Services | ⇧ | ✎ |
| 8748 · Business Consulting, Nec | ⇧ | ✎ |
| 9532 · Urban and Community Development | ⇧ | ✎ |

704 — (pointing to 3545 · Machine Tool Accessories row)

⊕ SIC Code Signal

Risk Signals
We Will Identify and Highlight Semantically Matching Words
and Adjust the Risk Score Appropriately.

| | | |
|---|---|---|
| Best Practices | ⇧ | ✎ |
| BreachID | ⇩ | ✎ |
| Bring Your Own Device (BYOD) | ⇩ | ✎ |
| Canada | ⇩ | ✎ |
| Canada Parented Company | ⇩ | ✎ |
| Canada Subsidiary | ⇩ | ✎ |
| CISO | ⇧ | ✎ |
| Confidential Client Information | | ✎ |
| Encrypted Data | ⇧ | ✎ |
| Intellectual Property/Trade Secrets | | ✎ |
| ISA 95 Compliant | ⇧ | ✎ |
| Legacy Equipment/Operating Systems | ⇩ | ✎ |
| MongoDB | ⇩ | ✎ |
| North America Presence | ⇩ | ✎ |
| Number of Branches/Sites | | ✎ |
| Number of Employees | | ✎ |
| Open DNS Resolver | ⇩ | ✎ |
| Oracle Database | ⇩ | ✎ |
| PII/PHI/PCI | | ✎ |
| RDP Protocol (MS Windows "Remote Desktop") | ⇩ | ✎ |
| Remote Diagnostics/External Access | | ✎ |
| Test | | ✎ |
| United States | ⇩ | ✎ |
| United States (US) Subsidiary | ⇩ | ✎ |
| US Parent Company | ⇩ | ✎ |

⊕ Keyword Signal 712  714  716  718  720

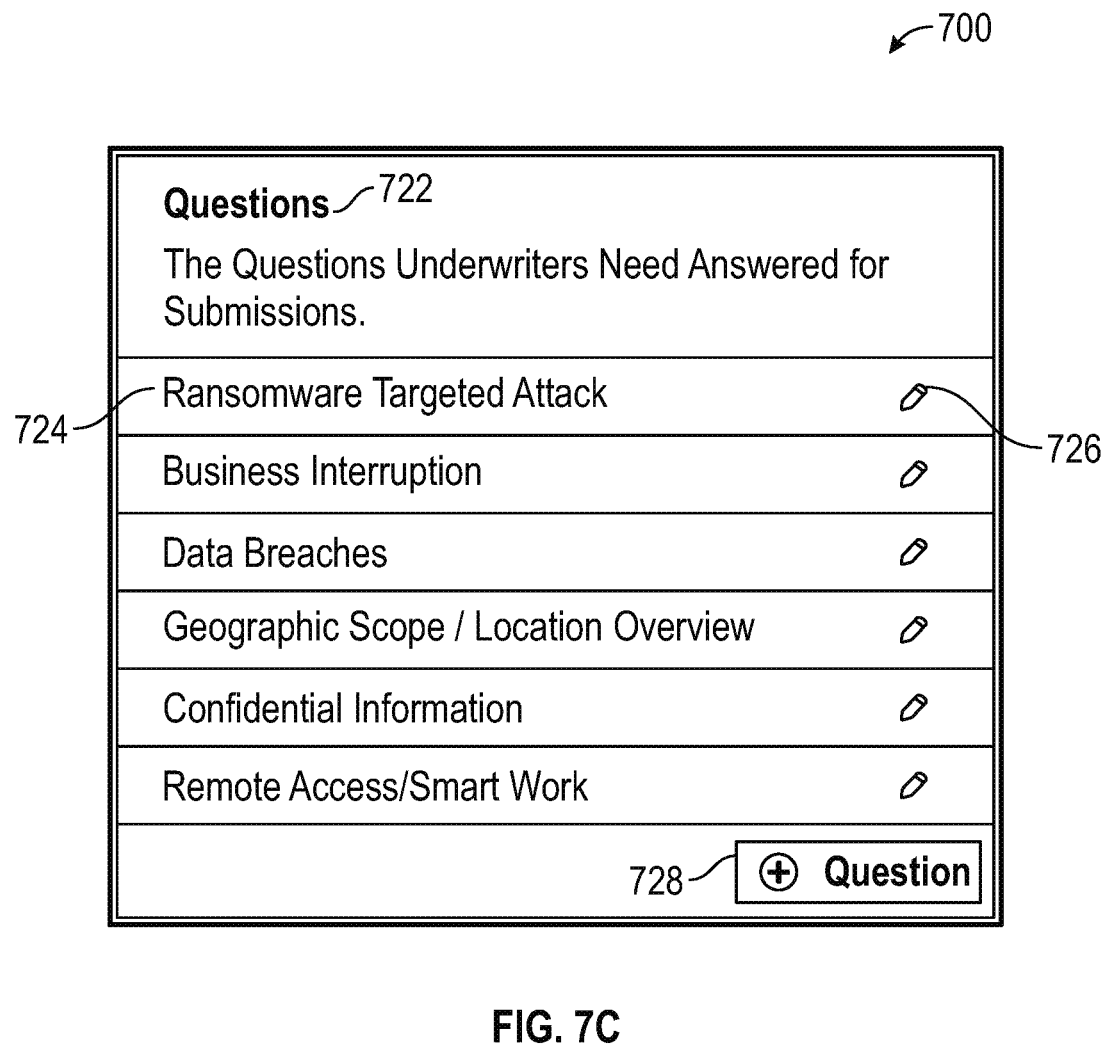

Questions 722

The Questions Underwriters Need Answered for Submissions.

| | |
|---|---|
| Ransomware Targeted Attack | ✎ |
| Business Interruption | ✎ |
| Data Breaches | ✎ |
| Geographic Scope / Location Overview | ✎ |
| Confidential Information | ✎ |
| Remote Access/Smart Work | ✎ |

724

726

728  ⊕ Question

FIG. 7C

EXTRACTING RULES AND DETERMINING RISK PARAMETERS FROM AN UNDERWRITING MANUAL

TECHNICAL FIELD

The present disclosure relates generally to underwriting, including extracting rules and determining risk parameters from an underwriting manual.

BACKGROUND

Insurance underwriting is the process of evaluating and analyzing the risks involved in insuring people and assets. In addition, insurance underwriting may include establishing pricing for accepted insurable risks.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 5 is a flowchart illustrating a process for extracting rules and determining risk parameters from an underwriting manual, in accordance with some examples.

FIGS. 6A-6B illustrate a guidelines user interface for displaying rules and risk parameters corresponding for a life insurance carrier, in accordance with some examples.

FIGS. 7A-7C illustrate a guidelines user interface for displaying rules and risk parameters for a property and casualty (P&C) insurance carrier, in accordance with some examples.

DETAILED DESCRIPTION

Insurance underwriting is the process of evaluating and analyzing the risks involved in insuring people and assets. When an insurance carrier determines whether to provide an insurance policy to an applicant, a human underwriter employed by the insurance carrier typically assesses the risk appetite (e.g., defined by rules and risk parameters) of the insurance carrier and the risk associated with applicant. The underwriter then determines whether the risk associated with the applicant is within the risk appetite for the insurance carrier.

The disclosed embodiments provide an insurance analytics system for analyzing an underwriting manual, in order to extract rules and determine risk parameters for the insurance carrier. The insurance carrier provides a copy of the underwriting manual to the insurance analytics system. The insurance analytics system implements or otherwise accesses one or more neural network models (e.g., transformer-based language model(s)) to extract rules and risk parameters from the underwriting manual. The rules and risk parameters correspond to the risk appetite for the insurance carrier. The insurance analytics system provides user interfaces which allow an end user (e.g., an underwriter) to view the rules and associated risk parameters, and to manually make any modifications.

Moreover, the insurance analytics system provides for receiving and analyzing a new submission (e.g., a new insurance application). Based on the extracted rules and risk parameters, the insurance analytics system generates a risk summary (e.g., a decision, score and/or personalized recommendation) for review by the underwriter.

By extracting rules and determining risk parameters in this manner, the insurance analytics system enhances capacity, accuracy and transparency of the underwriting process. The insurance analytics system also facilitates the review and analysis of underwriting manuals (e.g., typically performed manually and repetitively by an underwriter in association with underwriting computing software), thereby saving time for end users, and reducing computational resources/processing power.

Networked Computing Environment

Figure 1:
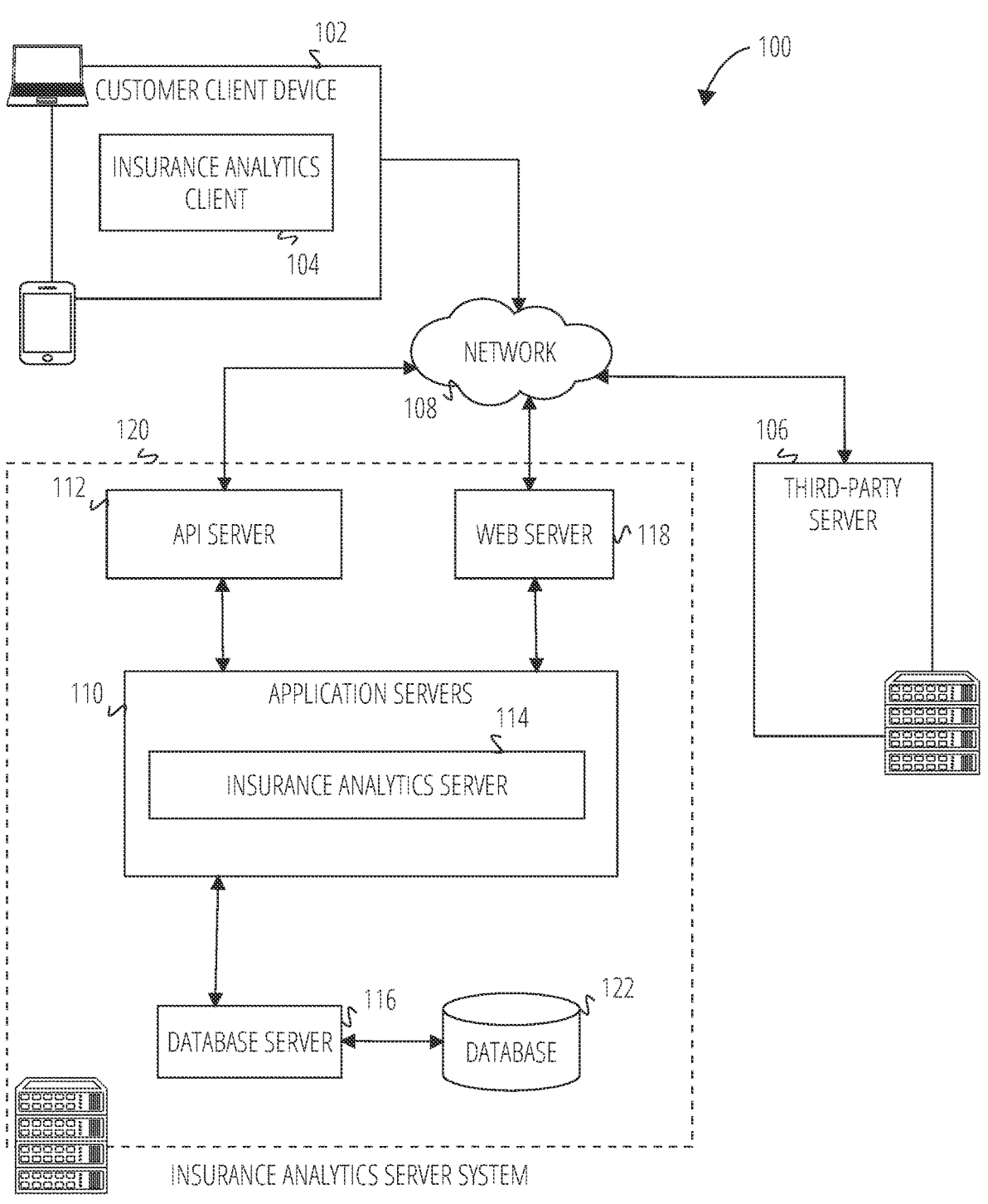
FIG. 1 is a block diagram showing an insurance analytics system in accordance with some examples.

FIG. 1 is a block diagram showing an insurance analytics system 100 in accordance with some examples. The insurance analytics system 100 can include multiple instances of a customer client device 102 and multiple instances of a third-party server 106.

The customer client device 102 is associated with a client of the insurance analytic s system 100. Examples of clients include financial institutions, insurance companies, analytics companies, etc. An underwriter (e.g., or administrative assistant, or other employee) can be the user of the customer client device 102.

Each of the customer client devices 102 hosts a number of applications, including an insurance analytics client 104. Each insurance analytics client 104 is communicatively coupled with an insurance analytics server system 120 and third-party servers 106 via a network 108 (e.g., communication network or the Internet). An insurance analytics client 104 can also communicate with locally-hosted applications using Applications Program Interfaces (APIs). The customer client devices 102 can also host a number of applications including Internet browsing applications (e.g., Chrome, Safari, etc.). The insurance analytics client 104 can also be implemented as a platform that is accessed by the customer client device 102 via an Internet browsing application or implemented as an extension on the Internet browsing application.

An insurance analytics client 104 is able to communicate and exchange data with the insurance analytics server system 120 via the network 108. The data exchanged between the insurance analytics client 104 and the insurance analytics server system 120, includes functions (e.g., commands to invoke functions) as well as payload data (e.g., underwriting manuals, risk submissions and applications, training material, feedback on the results and reporting provided).

The insurance analytics server system 120 can also communicate and exchange data with third-party server 106 to obtain further data and information on the customer, the applicants, as well as relevant standardized information (e.g., standardized codes). The third-party server 106 can be servers hosting different websites comprising this data and information.

The insurance analytics server system 120 supports various services and operations that are provided to the insurance analytics client 104. Such operations include access to the functionalities of the systems in insurance analytics server system 120. Data exchanges to and from the insurance analytics server system 120 are invoked and controlled through functions available via user interfaces (UIs) of the insurance analytics client 104.

The insurance analytics server system 120 provides server-side functionality via the network 108 to a particular insurance analytics client 104. While certain functions of the insurance analytics system 100 are described herein as being performed by either an insurance analytics client 104 or by the insurance analytics server system 120, the location of certain functionality either within the insurance analytics client 104 or the insurance analytics server system 120 may be a design choice. For example, it may be technically preferable to initially deploy certain technology and functionality within the insurance analytics server system 120 but to later migrate this technology and functionality to the insurance analytics client 104 where a customer client device 102 has sufficient processing capacity.

Turning now specifically to the insurance analytics server system 120, an Application Program Interface (API) server 112 is coupled to, and provides a programmatic interface to, application servers 110. The application servers 110 are communicatively coupled to a database server 116, which facilitates access to a database 122 that stores data from the third-party server 106 and customer client device 102 to be processed by the application servers 110. Similarly, a web server 118 is coupled to the application servers 110, and provides web-based interfaces to the application servers 110. To this end, the web server 118 processes incoming network requests over the Hypertext Transfer Protocol (HTTP) and several other related protocols.

The Application Program Interface (API) server 112 receives and transmits data between the customer client device 102 and the application servers 110. Specifically, the Application Program Interface (API) server 112 provides a set of interfaces (e.g., routines and protocols) that can be called or queried by the insurance analytics client 104 in order to invoke functionality of the application servers 110. The Application Program Interface (API) server 112 exposes to the insurance analytics client 104 various functions supported by the application servers 110, including generating information the risk evaluation of submissions, risk appetite result, inconsistency findings, etc.

Figure 2:
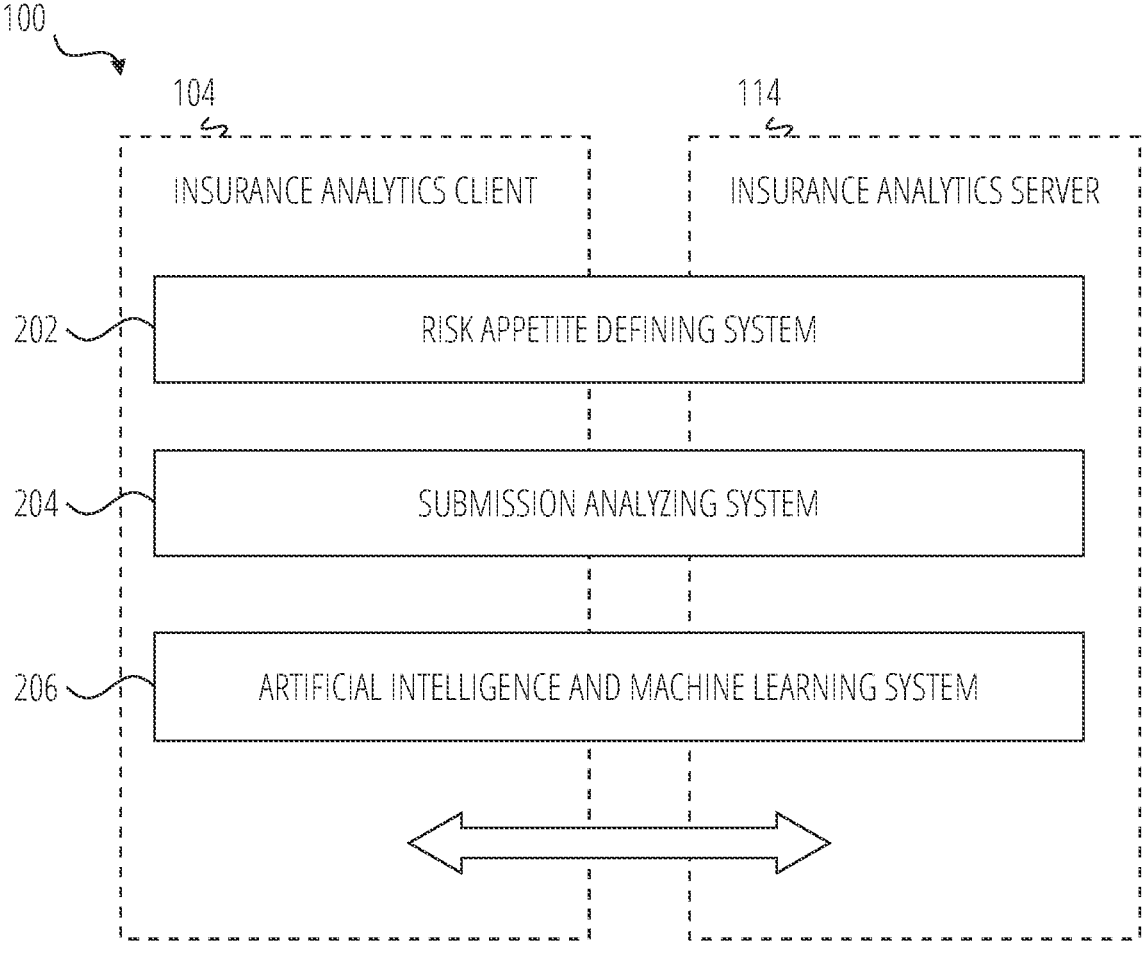
FIG. 2 is a block diagram illustrating further details regarding the insurance analytics system according to some examples.

The application servers 110 host a number of server applications and subsystems, including for example an insurance analytics server 114. The insurance analytics server 114 implements a number of data processing technologies and functions, particularly related to the processing of the customer's risk appetite, the risk analysis of submissions or applications, and the identification of inconsistencies in submissions requiring analysis of a plurality of sources. To perform these functions, the insurance analytics server 114 can also implement machine-learning solutions, neural networks, generative artificial intelligence (AI), natural language processing (NLP) techniques, etc. Other processor and memory intensive processing of data may also be performed server-side by the insurance analytics server 114, in view of the hardware requirements for such processing.
System Architecture FIG. 2 is a block diagram illustrating further details regarding the insurance analytics system 100 according to some examples. Specifically, the insurance analytics system 100 is shown to comprise the insurance analytics client 104 and the insurance analytics server 114. The insurance analytics system 100 embodies a number of subsystems, which are supported on the client-side by the insurance analytics client 104 and on the server-side by the insurance analytics server 114. These subsystems include, for example, a risk appetite defining system 202, a submission analyzing system 204, and an artificial intelligence and machine learning system 206.

The risk appetite defining system 202 is responsible for ingesting the customer's underwriting manual to extract rules that codify the customer's risk appetite. The risk appetite defining system 202 can receive the underwriting manual from the customer client device 102 or from the third-party server 106.

The submission analyzing system 204 is responsible for summarizing and classifying risk submissions that are received from the customer client device 102. The submission analyzing system 204 can further receive the risk appetite associated with a specific customer from the risk appetite defining system 202 to generate personalized recommendations regarding the risk associated with a given submission for a specific customer. The submission analyzing system 204 can further automatically classify the risk of the submission into standardized insurance codes by matching the summary description against classification databases in, for example, third-party server 106. Examples of classification codes assigned may include Standard Industrial Classification (SIC) codes and North American Industry Classification System (NAICS) codes.

Figure 3:
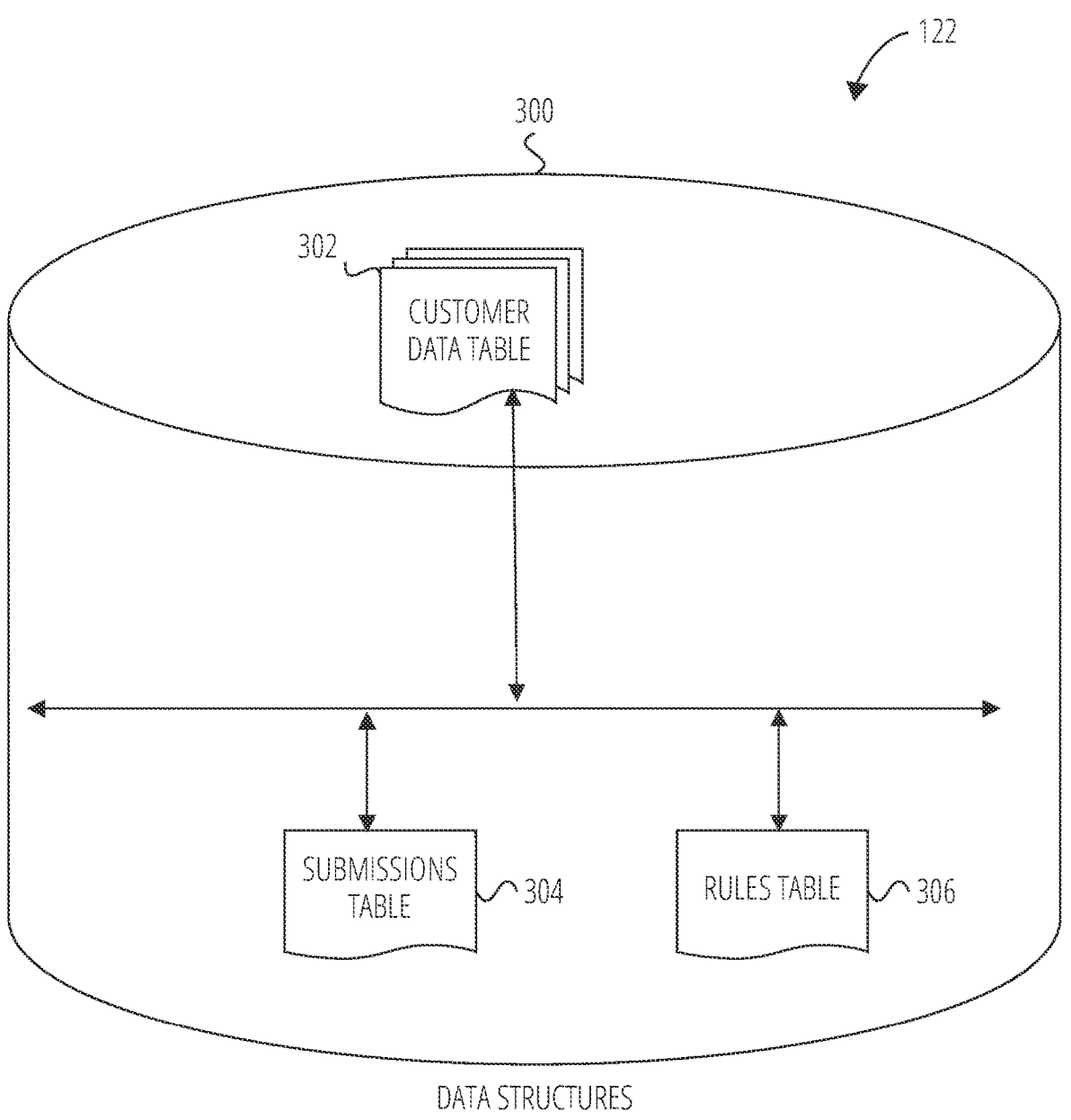
FIG. 3 is a diagrammatic representation of a data structure as maintained in a database, in accordance with some examples.

The artificial intelligence and machine learning system 206 provides a variety of services to different subsystems within the insurance analytics system 100. For example, the artificial intelligence and machine learning system 206 operates with the risk appetite defining system 202 to identify the language in the underwriting manual to be extracted and to generate the risk appetite rules and parameters based on this extracted language as well as the feedback received from the customer client device 102. The artificial intelligence and machine learning system 206 can also operate with risk appetite defining system 202 to generate the defined risk appetite for each of the customers. The artificial intelligence and machine learning system 206 can operate with the submission analyzing system 204 to generate the summaries and classifications based on the risk submissions that are received.
Data Architecture FIG. 3 is a schematic diagram illustrating the data structures 300, which may be stored in the database 122 of the insurance analytics server 114, according to certain examples. While the content of the database 122 is shown to comprise a number of tables, it will be appreciated that the data could be stored in other types of data structures (e.g., as an object-oriented database). The database 122 includes a customer data table 302, a submissions table 304, and a rules table 306.

The customer data table 302 stores data related to the customers (or clients) of the insurance analytics system 100 including identification information, locations, business area, etc. The customer data table 302 also stores data including the underwriting manual for each of the customers, the extracted guidelines and rules from the manual, the risk appetite rules and parameters that are generated based on the underwriting manual and the feedback received from the customer client device 102, the defined risk appetite for each of the customers as codified by the risk appetite rules and parameters.

The submissions table 304 stores data related to the applications and submissions to be analyzed by the submission analyzing system 204. For example, the submissions table 304 stores the applications and submissions received from the customer client device 102 and any supporting documents that were provided with the applications and submissions. The submissions table 304 also stores additional information and data obtained from third-party server 106 including scraped website data and third-party data feeds that are relevant to the submission or application. The submissions table 304 also stores data related to the standardized insurance or classification codes that are obtained via training of the submission analyzing system 204 or from third-party server 106. The submissions table 304 can further store the standardized codes in association with the applications or submissions.

The rules table 306 stores rules data generated for an underwriter, by the risk appetite defining system 202, in connection with an underwriting manual. The risk appetite defining system 202 is configured to analyze an underwriting manual (and optionally prior applications and/or prior feedback), in order to extract rules and determine risk parameters for the insurance carrier. In example embodiments, the rules correspond to structured, machine-readable data. The risk appetite defining system 202 is configured to store the extracted rules and risk parameters within the rules table 306.

Figure 4:
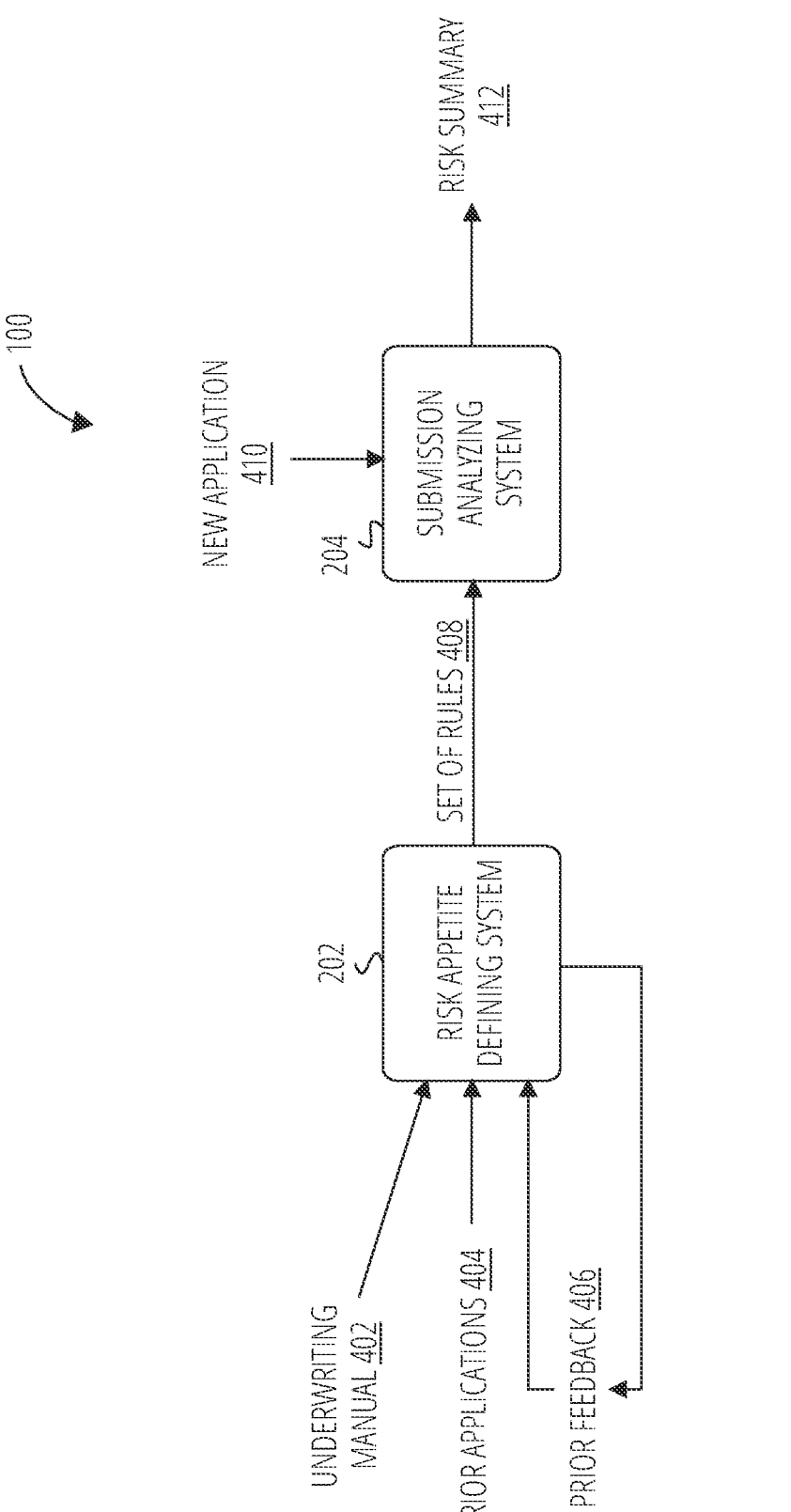
FIG. 4 illustrates the insurance analytics system as being configured to extract rules and determine risk parameters from an underwriting manual, in accordance with some examples.

FIG. 4 illustrates the insurance analytics system 100 as being configured to extract rules and determine risk parameters from an underwriting manual, in accordance with some examples. For example, the extracted rules and determined risk parameters correspond to a risk appetite for an insurance carrier.

As shown in the example of FIG. 4, the insurance analytics system 100 includes the risk appetite defining system 202 and the submission analyzing system 204 of FIG. 2. While not shown in FIG. 4, the risk appetite defining system 202 and/or the submission analyzing system 204 may access or otherwise interact with the artificial intelligence and machine learning system 206 of FIG. 2.

In example aspects, the risk appetite defining system 202 is configured to receive an underwriting manual 402, and optionally prior applications 404 and/or prior feedback 406 as input. As described herein, the underwriting manual 402 is a document, provided by an insurance carrier, that establishes the set of rules and requirements that are used by an underwriter to make decisions regarding the acceptance, modification, or rejection of an insurance application. Underwriting manuals can be different from one insurance carrier to the next. The underwriting manual 402 may have been provided by a customer client device 102, and stored within the customer data table 302 of the database 122.

For example, with respect to property and casualty (P&C) insurance, an underwriting manual for the insurance carrier establishes rules and risk parameters for one or more of the following traditional underwriting risk factors related to an applicant (e.g., a business): claims history, location, competitive risk, coverage limits, business structure, number of employees, annual income, building risks, business size, deductibles, industry, property, revenue, auto liability, business interruption, cyber risks, and/or equipment.

In another example, with respect to life insurance, an underwriting manual for the insurance carrier establishes rules and requirements for one or more of the following traditional underwriting risk factors related to an applicant (e.g., individual): age, health history, lifestyle, gender, tobacco use, occupation, finances, health, alcohol use, criminal history, driving record, hobbies, credit, heart disease, insurance history, obesity, and/or height.

In example aspects, the risk appetite defining system 202 is further configured to receive prior applications 404 as input. The prior applications 404 may have been provided by a customer client device 102, and stored within the customer data table 302 of the database 122. For example, the risk appetite defining system 202 may access the prior applications over a preset period of time (e.g., the last 2 years), or access a selected subset of prior applications (e.g., as selected by an underwriter).

Using P&C insurance as an example, the prior applications may span several product lines with different values for the above-listed P&C risk factors (e.g., claims history, location, competitive risk, coverage limits, etc.). For life insurance, the prior applications may span several applicants (e.g., individuals) with different values for the above-listed life risk factors (e.g., age, health history, lifestyle, etc.). In addition to the applicant information, the prior application data may include an indication of whether the applications were approved (e.g., together with any modifications for approval) or rejected.

In example aspects, the risk appetite defining system 202 is further configured to receive prior feedback 406 as input. For example, the prior feedback 406 corresponds to feedback, manually provided by users (e.g., underwriters) with respect to prior insurance application. As discussed further below with respect to FIGS. 6A-6B and 7A-7C, the feedback may correspond to edits or modifications submitted by users in response based on prior sets of rules generated by the risk appetite defining system 202. Thus, FIG. 4 depicts the prior feedback 406 within a continuous feedback loop corresponding to both input and output with respect to the risk appetite defining system 202. In example embodiments, the feedback loop implements or otherwise includes a regulatory checkpoint for ensuring data integrity for the prior feedback 406.

As noted above, the risk appetite defining system 202 operates in conjunction with the artificial intelligence and machine learning system 206 to identify the language in the underwriting manual 402 to be extracted, and to generate the set of rules 408. The set of rules 408 is based on the extracted language from the underwriting manual 402, as well as any received (optional) prior applications 404 and/or prior feedback 406.

In example aspects, the artificial intelligence and machine learning system 206 implements or otherwise accesses a combination of neural network models (e.g., generative artificial intelligence models) in order to determine the set of rules 408 based on the underwriting manual 402, prior applications 404 and/or set of rules 408. The combination of neural network models includes one or more large language models, and corresponds to transformer-based models which are fine-tuned on insurance data to understand the complex language and terminology in underwriting manuals. For example, the combination of neural network models includes one or more generative pre-trained transformers (e.g., OpenAI GPT, Anthropic Claude, and the like) in combination with additional models pre-trained on insurance data for extracting rules from underwriting manuals.

With respect to training the neural network models, these models may implement or otherwise access machine learning algorithm(s) configured to learn from existing data and make predictions about new data. For example, the machine learning algorithm(s) operate by building the neural network models from example training data in order to make data-driven predictions or decisions for generating sets of rules (e.g., the set of rules 408).

In example aspects, the risk appetite defining system 202 in conjunction with the artificial intelligence and machine learning system 206 is configured to generate the set of rules 408 in a structured, machine-readable format. Thus, the risk appetite defining system 202 is configured to receive unstructured data (e.g., text from the underwriting manual 402, the prior applications 404 and/or the prior feedback 406) and to generate structured data corresponding to the set of rules 408.

In example aspects, the set of rules 408 is structured in a manner so as to indicate one or more rules for: code signals, risk signals, and questions and answers, or "Q&A". For P&C insurance, the set of rules 408 is structured in a machine-readable format to indicate rules for all of code signals, risk signals, and Q&A. On the other hand, for life insurance, the set of rules 408 is structured in a machine-readable format to indicate rules for items risk signals and Q&A (and not code signals).

As noted above, code signals correspond to standardized insurance codes (e.g., NAICS and/or SIC codes) for identifying and defining a business. The risk appetite defining system 202 is configured to determine the code signals for the insurance carrier, based on the inputs 402, 404 and/or 406. The risk appetite defining system 202 is configured to compare portions (e.g., text, image) of the underwriting manual 402 against known classification databases (e.g., for NAICS, SIC) which include the code signals.

For each determined code signal, and based on the inputs 402, 404 and/or 406, the risk appetite defining system 202 in conjunction with the artificial intelligence and machine learning system 206 is configured to select a value (e.g., risk parameter), from a predefined range of values, which represents the risk appetite for the insurance carrier. For example, the range of values include three values of: like (meaning the insurance carrier prefers the code signal), dislike (meaning the insurance carrier does not does not prefer the code signal but would not an applicant based on a single signal) or disqualify (meaning the applicant is disqualified based on the single signal). Thus, the set of rules 408 indicates the code signals and values for the insurance carrier (e.g., for P&C insurance).

With respect to risk signals, the risk appetite defining system 202 is configured to determine the risk signals for the insurance carrier based on the inputs 402, 404 and/or 406. As noted above, the risk signal categories for P&C insurance relate to claims history, location, competitive risk, coverage limits, etc., and the risk signals for life insurance relate to age, health history, lifestyle, etc. In addition, the risk appetite defining system 202 in conjunction with the artificial intelligence and machine learning system 206 is configured to select a value, from a predefined range of values (e.g., like, dislike or disqualify) which represents the risk appetite for the insurance carrier. Thus, the set of rules 408 indicates the risk signals and values for the insurance carrier.

With respect to Q&A, the risk appetite defining system 202 is configured to generate questions and answers for the insurance carrier based on the inputs 402, 404 and/or 406. For example, the underwriting manual 402 may include, in an unstructured format, various questions and answers as they relate to one or more of code signals, risk signals, and/or general questions. In example embodiments, the above-described risk signals also relate to findings within Q&A. The risk appetite defining system 202 in conjunction with the artificial intelligence and machine learning system 206 is configured to extract such Q&A. Thus, the set of rules 408 indicates Q&A corresponding to the insurance carrier.

The risk appetite defining system 202 is configured to store the set of rules 408 and risk parameters in association with the respective insurance carrier. For example, the set of rules 408 and risk parameters are stored within the rules table 306 of the database 122.

As discussed further below with respect to FIGS. 6A-6B and 7A-7C, the risk appetite defining system 202 provides user interfaces for viewing and/or editing the set of rules 408 and risk parameters as generated by the risk appetite defining system 202. Moreover, the user (e.g., underwriter) can manually input and/or edit individual rules and/or risk parameters, and these edits are stored within the rules table 306. Moreover, the edits are fed back into the artificial intelligence and machine learning system 206 for improving subsequent predictions (e.g., sets of rules, rule parameters) by the neural network(s). Thus, the risk appetite defining system 202 is depicted as outputting the prior feedback 406, which is provided as subsequent input for the risk appetite defining system 202 (e.g., with respect to a subsequent underwriting manual). As noted above, this continuous feedback loop may implement or otherwise include a regulatory checkpoint for ensuring data integrity for the prior feedback 406.

In example aspects, the submission analyzing system 204 in conjunction with the artificial intelligence and machine learning system 206 is configured to generate the risk summary 412 based on the risk submission input. As shown in the example of FIG. 4, the inputs provided to the submission analyzing system 204 include the set of rules 408 and the new application 410. The set of rules 408 include the structured data, in machine-readable format, indicating the code signals, risk signals and/or Q&A for the insurance carrier. In addition, the new application 410 may be provided by the customer client device 102 and corresponds to a prospective business/individual seeking insurance from the insurance carrier.

Based on the received set of rules 408 and new application 410, the submission analyzing system 204 in conjunction with the artificial intelligence and machine learning system 206 provides the risk summary 412 as output. In example aspects, the risk summary 412 corresponds to one or more of a decision, score or personalized recommendation regarding the risk associated with a given submission for a specific insurance carrier. For example, the decision corresponds to a "yes" or "no" decision on whether to insure the applicant, where the decision is automatically determined by the submission analyzing system 204 for review by an underwriter. In another example, the score corresponds to a 0-5 risk rating (e.g., with 0 being disqualified, 1 being highest risk and 5 being optimal/lowest risk). In another example, the personalized recommendation provides a high-level summary of the applicant, associated risks (e.g., in a text-based summary description), and associated codes. In this regard, the submission analyzing system 204 may automatically classify the risk of the submission into standardized insurance codes (e.g., NAICS, SIC) by matching the summary description against classification databases.

Thus, the insurance analytics system 100 employs neural network model(s) in analyzing an underwriting manual, prior submissions and/or prior feedback, in order to extract rules and determine risk parameters for an insurance carrier. The insurance analytics system 100 provides user interfaces which allow an end user (e.g., an underwriter) to view the rules and associated risk parameters, and to manually make any modifications. Moreover, the insurance analytics system provides for receiving and analyzing a new application submission (e.g., for a prospective insured individual or business) based on the rules and risk parameters, and for generating a risk summary (e.g., a decision, score and/or personalized recommendation) for review by the underwriter.

By extracting rules and determining risk parameters in this manner, the insurance analytics system enhances capacity, accuracy and transparency of the underwriting process. Moreover, the insurance analytics system facilitates the review and analysis of underwriting manuals in view of prior submissions/feedback (e.g., typically performed manually and repetitively by an underwriter in association with underwriting computing software), thereby saving time for end users, and reducing computational resources/processing power.

FIG. 5 is a flowchart illustrating a process 500 for extracting rules and determining risk parameters from an underwriting manual, in accordance with some examples. For explanatory purposes, the process 500 is primarily described herein with reference to the risk appetite defining system 202 and submission analyzing system 204 of FIG. 2, and the customer client device 102 of FIG. 1. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

The risk appetite defining system 202 receives, from the customer client device 102, an underwriting manual for an insurance carrier (block 502). The underwriting manual includes text (e.g., unstructured text) describing rules, guidelines and parameters defining a risk appetite of the insurance carrier. In example aspects, the insurance carrier corresponds to either property and casualty (P&C) insurance or to life insurance.

The risk appetite defining system 202 processes the underwriting manual using one or more neural network models (block 504). For example, the one or more neural network models were trained with domain-specific data to analyze text across plural underwriting manuals. In example aspects, the one or more neural network models include a transformer-based language model fine-tuned on the domain-specific data.

In example aspects, the processing is further performed on prior applications or prior user feedback associated with the insurance carrier using the one or more neural network models, the one or more neural network models having been further trained with domain-specific data to analyze prior applications and prior user feedback.

The risk appetite defining system 202 determines, based on the processing, insurance rules and risk parameters for the text in the underwriting manual (block 506). The risk appetite defining system 202, in conjunction with the artificial intelligence and machine learning system 206, generates a set of rules based on the insurance rules and risk parameters (block 508).

In example aspects, the set of rules is a structured, machine-readable set of rules that codifies the insurance rules and risk parameters. The risk appetite defining system 202 stores the set of rules in a data store (e.g., the rules table 306 of the database 122).

In example aspects, the risk appetite defining system 202 identifies standardized codes from the text within the underwriting manual. The standardized codes define and classify businesses, and generating the set of rules is based on the standardized codes. For example, the standardized codes include at least one of Standard Industrial Classification (SIC) codes or North American Industry Classification System (NAICS) codes to define and classify the businesses.

In example aspects, the submission analyzing system 204 (e.g., at a later time such as days later) receives an insurance application for underwriting, and analyzes the insurance application against the stored set of rules to determine a risk summary for the insurance carrier. Prior to the analyzing, the submission analyzing system 204 accesses the set of rules from the data store. In example aspects, the risk summary includes an underwriting decision for the insurance application.

FIGS. 6A-6B illustrate a guidelines user interface 600 for displaying rules and risk parameters for a life insurance carrier, in accordance with some examples. The guidelines user interface 600 is displayable on the customer client device 102, which is operated by an underwriter of the life insurance carrier. The guidelines user interface 600 is provided by the risk appetite defining system 202 and allows the user (e.g., underwriter) to view and/or edit rules corresponding to risk appetite.

In the example of FIG. 6A, the guidelines user interface 600 includes a medical signals section 602 with a list of medical signals. For each listed medical signal, the guidelines user interface 600 includes a respective description 604, value 606 and edit button 608.

As noted above, the rules corresponding to risk appetite for a prospective insured individual relate to one or more of the following factors: age, health history, lifestyle, gender, tobacco use, occupation, finances, health, alcohol use, criminal history, driving record, hobbies, credit, heart disease, insurance history, obesity, and/or height. The example of FIG. 6A includes multiple medical signals and risk parameters that generally relate to these factors.

For each listed medical signal in FIG. 6A, the guidelines user interface 600 provides for the user to view the description 604 of the signal. In example aspects, the edit button 608 is user-selectable to edit the description for a particular signal.

In addition, for each listed medical signal, the guidelines user interface 600 provides for the user to view and/or edit a corresponding value 606 (e.g., risk parameter). As noted above, the value is selected from a predefined range of values (e.g., like, dislike or disqualify), based on extracting rules from the underwriting manual 402, the prior applications 404 and/or prior feedback 406. In the example of FIG. 6A, the "like" value is depicted as an up arrow, the "dislike" value is depicted by a down arrow, and the "disqualify" value is depicted by a prohibition sign.

In example aspects, the value 606 is user-selectable to edit the value for a particular signal. In this manner, the user may manually modify the rules for a particular signal. Moreover, the add signal button 610 is user-selectable to add a new signal description and value pair.

Thus, the guidelines user interface 600 provides for the user to modify the description and/or value for an existing signal, or to create a new signal with a corresponding description and value. In example aspects, the risk appetite defining system 202 stored any manual updates within the database 122 (e.g., within the customer data table 302). Moreover, the risk appetite defining system 202 in conjunction with the artificial intelligence and machine learning system 206 may update the one or more neural networks of the artificial intelligence and machine learning system 206 based on such modification or addition, to improve future accuracy of the one or more neural networks.

As shown in the example of FIG. 6B, the guidelines user interface 600 further includes a Q&A section 612. While FIGS. 6A-6B are depicted as separate, the Q&A section 612 may be displayed directly below the medical signals section 602 within the guidelines user interface 600.

As noted above, the rules corresponding to risk appetite may include Q&A corresponding to a life insurance carrier. The example of FIG. 6B does not include and Q&A pairs. However, the guidelines user interface 600 includes an add question button 614 which is user-selectable to add one or more Q&A pairs to the set of rules for the insurance carrier. While not shown in FIG. 6B, the guidelines user interface 600 may provide user-selectable elements for modifying existing Q&A pairs. The risk appetite defining system 202 stores any manual updates within the customer data table 302. Moreover, the risk appetite defining system 202 in conjunction with the artificial intelligence and machine learning system 206 may update the one or more neural networks of the artificial intelligence and machine learning system 206 based on modified and/or added Q&A pairs, to improve future accuracy of the one or more neural networks.

FIGS. 7A-7C illustrate a guidelines user interface 700 for displaying rules and risk parameters for a P&C insurance carrier, in accordance with some examples. The guidelines user interface 700 is displayable on the customer client device 102, which is operated by an underwriter of the life insurance carrier. The guidelines user interface 700 is provided by the risk appetite defining system 202 and allows the user (e.g., underwriter) to view and/or edit rules corresponding to risk appetite.

In the example of FIG. 7A, the guidelines user interface 700 includes a code signals section 702 with a list of code signals. For each listed code signal, the guidelines user interface 700 includes a respective description 704, value 706 and edit button 708.

As noted above, the rules corresponding to risk appetite for a prospective insured business may include code signals corresponding to standardized insurance codes (e.g., NAICS, SIC) for identifying and defining a business. The example of FIG. 7A includes multiple code signals.

For each listed code signal, the guidelines user interface 700 provides for the user to view the description 704 of the signal (e.g., the code signal number and title). In example aspects, the edit button 608 is user-selectable to edit the description (e.g., the code signal number and title) for a particular signal.

In addition, for each listed code signal, the guidelines user interface 700 provides for the user to view and/or edit a corresponding value 706. As noted above, the value is selected from a predefined range of values (e.g., like, dislike or disqualify), based on extracting rules from the underwriting manual 402, the prior applications 404 and/or prior feedback 406.

In example aspects, the value 706 is user-selectable to edit the value for a particular signal. In this manner, the user may manually modify the rules for a particular signal. Moreover, the add signal button 710 is user-selectable to add a new signal description and value pair.

Thus, the guidelines user interface 700 provides for the user to modify the description and/or value for an existing signal, or to create a new signal with a corresponding description and value. In example aspects, the risk appetite defining system 202 stores any manual updates in the customer data table 302. Moreover, the risk appetite defining system 202 in conjunction with the artificial intelligence and machine learning system 206 may update the one or more neural networks of the artificial intelligence and machine learning system 206 based on such modification or addition, to improve future accuracy of the one or more neural networks.

As shown in the example of FIG. 7B, the guidelines user interface 700 further includes a risk signals section 712. While FIGS. 7A-7B are depicted as separate, the risk signals section 712 may be displayed directly below the code signals section 702 within the guidelines user interface 700.

In the example of FIG. 7B, the risk signals section 712 includes a list of risk signals. For each listed risk signal, the guidelines user interface 700 includes a respective signal 714, value 716 and edit button 718.

As noted above, the rules corresponding to risk appetite for a prospective insured business relate to one or more of the following factors: claims history, location, competitive risk, coverage limits, business structure, number of employees, annual income, building risks, business size, deductibles, industry, property, revenue, auto liability, business interruption, cyber risks, and/or equipment. The example of FIG. 7B includes multiple risk signals that generally relate to these factors.

For each listed risk signal, the guidelines user interface 700 provides for the user to view the description of the signal 714. In example aspects, the edit button 718 is user-selectable to edit the description for a particular signal.

In addition, for each listed risk signal, the guidelines user interface 700 provides for the user to view and/or edit a corresponding value 716 (e.g., risk parameter). As noted above, the value is selected from a predefined range of values (e.g., like, dislike or disqualify), based on extracting rules from the underwriting manual 402, the prior applications 404 and/or prior feedback 406. The example of FIG. 7B includes values that are blank, for example, representing that there is no preference (e.g., like, dislike, disqualify) indicated by the set of rules.

In example aspects, the value 716 is user-selectable to edit the value for a particular signal. In this manner, the user may manually modify the rules for a particular signal. Moreover, the add signal button 720 is user-selectable to add a new signal description and value pair.

Thus, the guidelines user interface 600 provides for the user to modify the description and/or value for an existing signal, or to create a new signal with a corresponding description and value. In example aspects, the risk appetite defining system 202 stores any manual updates within the customer data table 302. Moreover, the risk appetite defining system 202 in conjunction with the artificial intelligence and machine learning system 206 may update the one or more neural networks of the artificial intelligence and machine learning system 206 based on such modification or addition, to improve future accuracy of the one or more neural networks.

As shown in the example of FIG. 7C, the guidelines user interface 700 further includes a Q&A section 722. While FIGS. 7B-7C are depicted as separate, the Q&A section 722 may be displayed directly below the risk signals section 712 within the guidelines user interface 700.

As noted above, the rules corresponding to risk appetite may include Q&A corresponding to a P&C insurance carrier. For each listed Q&A pair 724, the guidelines user interface 700 provides for the user to view the Q&A pair 724, and to edit the Q&A pair 724 via the edit button 726.

In addition, the guidelines user interface 700 includes an add question button 728 which is user-selectable to add one or more Q&A pairs to the set of rules for the insurance carrier. The risk appetite defining system 202 stores any manual updates within the customer data table 302. Moreover, the risk appetite defining system 202 in conjunction with the artificial intelligence and machine learning system 206 may update the one or more neural networks of the artificial intelligence and machine learning system 206 based on modified and/or added Q&A pairs, to improve future accuracy of the one or more neural networks.

Machine Architecture

Figure 8:
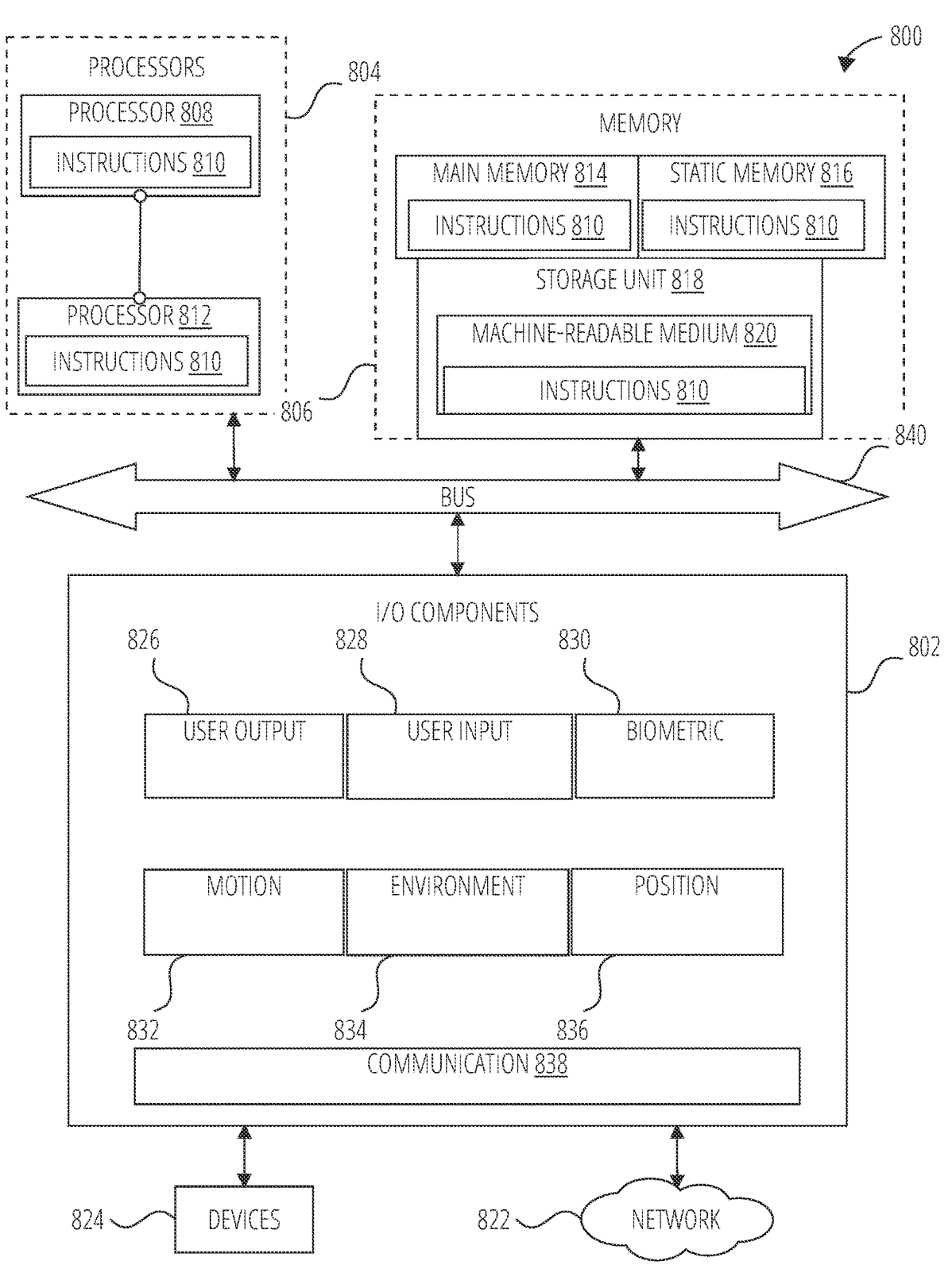
FIG. 8 is a diagrammatic representation of a machine in the form of a computer system within which a set of instructions may be executed for causing the machine to perform any one or more of the methodologies discussed herein, in accordance with some examples.

In some examples, components in the insurance analytics system 100 can be a machine 800 as shown in FIG. 8. FIG. 8 is a diagrammatic representation of the machine 800 within which instructions 810 (e.g., software, a program, an application, an applet, an application, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the customer client device 102 or any one of a number of server devices forming part of the insurance analytics server 114. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 814, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the customer client device 102 may have a camera system comprising, for example, front cameras on a front surface of the customer client device 102 and rear cameras on a rear surface of the customer client device 102. The front cameras may, for example, be used to capture still images and video of a user of the customer client device 102 (e.g., "selfies"). The rear cameras may, for example, be used to capture still images and videos in a more traditional camera mode. In addition to front and rear cameras, the customer client device 102 may also include a 3600 camera for capturing 360° photographs and videos.

Further, the camera system of a customer client device 102 may include dual rear cameras (e.g., a primary camera as well as a depth-sensing camera), or even triple, quad or penta rear camera configurations on the front and rear sides of the customer client device 102. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
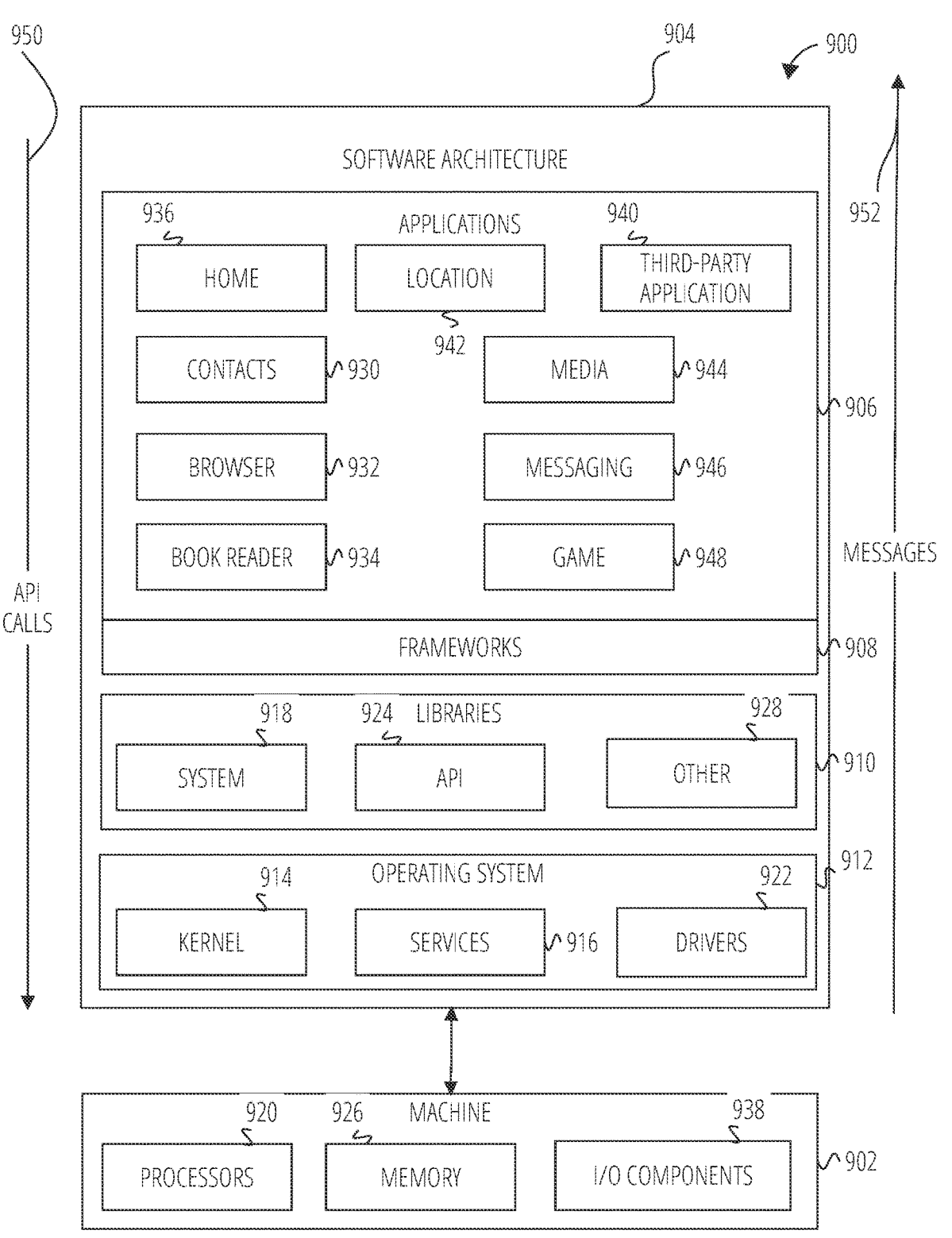
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:

receiving an underwriting manual for an insurance carrier, wherein the underwriting manual comprises text describing rules, guidelines and parameters defining a risk appetite of the insurance carrier, wherein the text within the underwriting manual is unstructured text;

processing the underwriting manual using one or more neural network models deployed specifically for the insurance carrier, the one or more neural network models having been initially trained with domain-specific data to analyze text across plural underwriting manuals from multiple insurance carriers to create a general underwriting model, and subsequently customized and retrained based on specific underwriting manual and prior applications of the insurance carrier to create a carrier-specific deployment;

determining, based on the processing, insurance rules and risk parameters for the text in the underwriting manual;

generating, using one or more neural networks models deployed specifically for the insurance carrier, a set of rules based on the insurance rules and risk parameters, wherein the one or more neural networks are configured to generate the set of rules as a machine-readable set of rules structured to indicate code signals, risk signals or questions and answers, for codifying the risk appetite of the insurance carrier, wherein the specific deployment for the insurance carrier provides enhanced security by maintaining carrier-specific data separate from other carriers and provides improved processing efficiency compared to manual underwriting analysis;

causing display of a user interface which lists the code signals, risk signals or questions and answers together with a respective value for each of the code signals, risk signals or questions and answers, each of the respective values being modifiable by a user via the user interface;

receiving, via the user interface, user input to modify a first respective value of the respective values; and performing additional training of the one or more neural networks models based on modifying the first respective value, wherein the additional training further customizes the one or more neural network models for the specific insurance carrier and improves accuracy and efficiency beyond human underwriter capabilities.

2. The method of claim 1, further comprising:
receiving an insurance application for underwriting; and
analyzing the insurance application against the set of rules to determine a risk summary for the insurance carrier.

3. The method of claim 2, further comprising:
storing the set of rules in a data store; and
accessing, prior to the analyzing, the set of rules from the data store.

4. The method of claim 2, wherein the risk summary includes an underwriting decision for the insurance application.

5. The method of claim 1, wherein the one or more neural network models comprise a transformer-based language model fine-tuned on the domain-specific data.

6. The method of claim 1, wherein the insurance carrier corresponds to property and casualty (P&C) insurance or to life insurance.

7. The method of claim 1, further comprising:
identifying standardized codes from the text within the underwriting manual, the standardized codes for defining and classifying businesses,
wherein generating the set of rules is based on the standardized codes.

8. The method of claim 7, wherein the standardized codes include at least one of Standard Industrial Classification (SIC) codes or North American Industry Classification System (NAICS) codes to define and classify the businesses.

9. The method of claim 1, wherein the processing is further performed on prior applications or prior user feedback associated with the insurance carrier using the one or more neural network models, the one or more neural network models having been further trained with domain-specific data to analyze prior applications and prior user feedback.

10. The method of claim 1, wherein the one or more neural network models comprise one or more generative pre-trained transformers in combination with additional models pre-trained on insurance data for extracting rules from underwriting manuals.

11. A system comprising:
at least one processor;
at least one memory component storing instructions that, when executed by the at least one processor, cause the at least one processor to perform operations comprising:
receiving an underwriting manual for an insurance carrier, wherein the underwriting manual comprises text describing rules, guidelines and parameters defining a risk appetite of the insurance carrier, wherein the text within the underwriting manual is unstructured text;
processing the underwriting manual using one or more neural network models deployed specifically for the insurance carrier, the one or more neural network models having been initially trained with domain-specific data to analyze text across plural underwriting manuals from multiple insurance carriers to create a general underwriting model, and subsequently customized and retrained based on specific underwriting manual and prior applications of the insurance carrier to create a carrier-specific deployment;
determining, based on the processing, insurance rules and risk parameters for the text in the underwriting manual;
generating, using one or more neural networks models deployed specifically for the insurance carrier, a set of rules based on the insurance rules and risk parameters, wherein the one or more neural networks are configured to generate the set of rules as a machine-readable set of rules structured to indicate code signals, risk signals or questions and answers, for codifying the risk appetite of the insurance carrier, wherein the specific deployment for the insurance carrier provides enhanced security by maintaining carrier-specific data separate from other carriers and provides improved processing efficiency compared to manual underwriting analysis;
causing display of a user interface which lists the code signals, risk signals or questions and answers together with a respective value for each of the code signals, risk signals or questions and answers, each of the respective values being modifiable by a user via the user interface;
receiving, via the user interface, user input to modify a first respective value of the respective values; and
performing additional training of the one or more neural networks models based on modifying the first respective value, wherein the additional training further customizes the one or more neural network models for the specific insurance carrier and improves accuracy and efficiency beyond human underwriter capabilities.

12. The system of claim 11, the operations further comprising:
receiving an insurance application for underwriting; and
analyzing the insurance application against the set of rules to determine a risk summary for the insurance carrier.

13. The system of claim 12, the operations further comprising:
storing the set of rules in a data store; and
accessing, prior to the analyzing, the set of rules from the data store.

14. The system of claim 12, wherein the risk summary includes an underwriting decision for the insurance application.

15. The system of claim 11, wherein the one or more neural network models comprise a transformer-based language model fine-tuned on the domain-specific data.

16. The system of claim 11, wherein the insurance carrier corresponds to property and casualty (P&C) insurance or to life insurance.

17. The system of claim 11, the operations further comprising:

identifying standardized codes from the text within the underwriting manual, the standardized codes for defining and classifying businesses, wherein generating the set of rules is based on the standardized codes.

18. The system of claim 17, wherein the standardized codes include at least one of Standard Industrial Classification (SIC) codes or North American Industry Classification System (NAICS) to define and classify the businesses.

19. A non-transitory computer-readable storage medium storing instructions that, when executed by at least one processor, cause the at least one processor to perform operations comprising:

receiving an underwriting manual for an insurance carrier, wherein the underwriting manual comprises text describing rules, guidelines and parameters defining a risk appetite of the insurance carrier, wherein the text within the underwriting manual is unstructured text;

processing the underwriting manual using one or more neural network models deployed specifically for the insurance carrier, the one or more neural network models having been initially trained with domain-specific data to analyze text across plural underwriting manuals from multiple insurance carriers to create a general underwriting model, and subsequently customized and retrained based on specific underwriting manual and prior applications of the insurance carrier to create a carrier-specific deployment;

determining, based on the processing, insurance rules and risk parameters for the text in the underwriting manual;

generating, using one or more neural networks models deployed specifically for the insurance carrier, a set of rules based on the insurance rules and risk parameters, wherein the one or more neural networks are configured to generate the set of rules as a machine-readable set of rules structured to indicate code signals, risk signals or questions and answers, for codifying the risk appetite of the insurance carrier, wherein the specific deployment for the insurance carrier provides enhanced security by maintaining carrier-specific data separate from other carriers and provides improved processing efficiency compared to manual underwriting analysis;

causing display of a user interface which lists the code signals, risk signals or questions and answers together with a respective value for each of the code signals, risk signals or questions and answers, each of the respective values being modifiable by a user via the user interface;

receiving, via the user interface, user input to modify a first respective value of the respective values; and performing additional training of the one or more neural networks models based on modifying the first respective value, wherein the additional training further customizes the one or more neural network models for the specific insurance carrier and improves accuracy and efficiency beyond human underwriter capabilities.

* * * * *